United States Patent Office

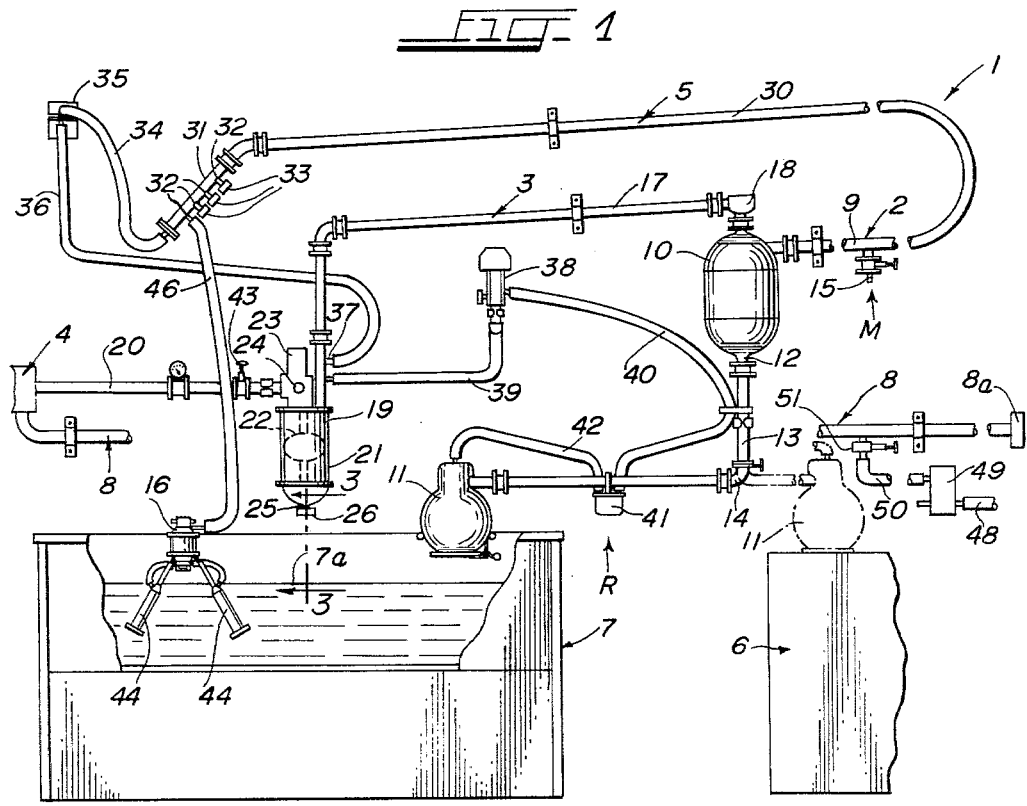
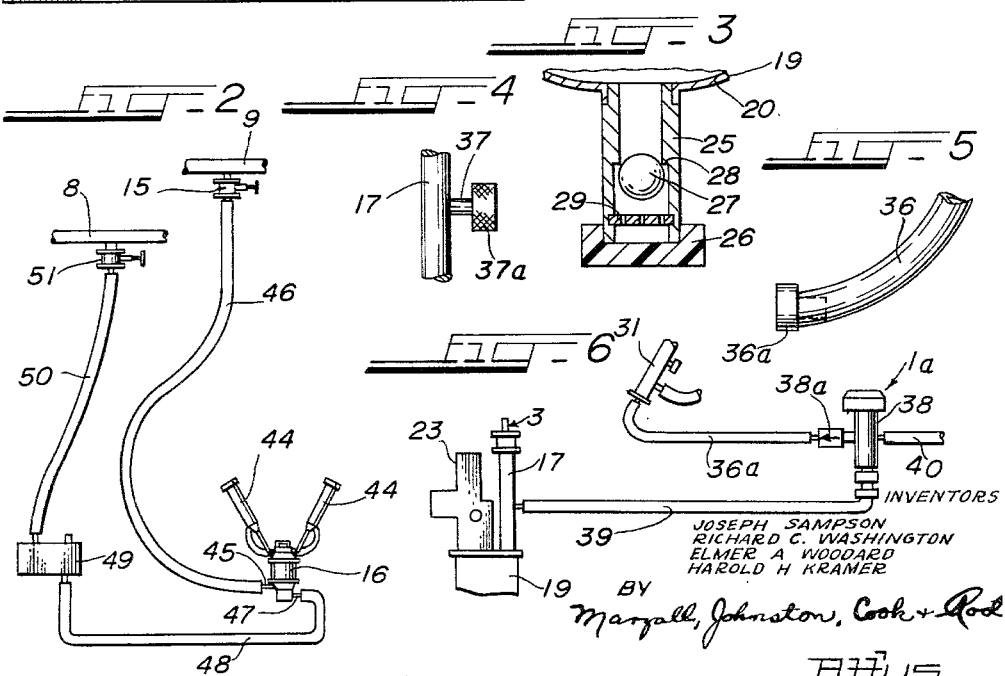

3,228,374
Patented Jan. 11, 1966

3,228,374
MILKING AND WASHING SYSTEMS
Joseph Sampson, Tomahawk, Richard C. Washington, Merrill, and Elmer A. Woodard, Tomahawk, Wis., and Harold H. Kramer, Rochester, Minn., assignors to U.S. Industries, Inc., New York, N.Y., a corporation of Delaware
Filed Nov. 1, 1963, Ser. No. 320,756
11 Claims. (Cl. 119—14.18)

This invention relates to milking systems and, more particularly, to milking systems which are particularly well adapted for use as permanent pipe line milking systems.

It is a primary object of the present invention to afford a novel milking system.

In relatively recent years, milking systems which include apparatus for withdrawing milk from cows, and the like, at a milking station; and permanent pipe lines for feeding the milk from the milking station to a receiving station, where it is automatically discharged or dumped into a suitable receptacle, such as a cooling tank, have become increasingly popular. In many, if not most, of such installations the milking station is relatively far removed from the receiving station, and the latter is commonly in a room separate from the milking station for sanitation purposes. Inasmuch as milking systems, for sanitation purposes, must be thoroughly washed and cleaned after each milking time, the relatively extensive conduit system and associated parts of a permanent pipe line milking system affords a substantial cleaning and washing problem. It is an important object of the present invention to enable such a milking system to be quickly and easily cleaned in a novel and expeditious manner.

Permanent pipe line milking systems of the general nature of the milking system to which the present invention appertains have been heretofore known in the art. However, such systems as have been heretofore known have had several inherent disadvantages such as, for example, not being efficient and reliable in operation; being large and cumbersome in size; or being difficult to clean, and the like. It is an object of the present invention to enable such disadvantages to be overcome.

In dairy operations wherein permanent pipe line systems are used, it commonly occurs during the operation thereof that the operator is not at the receiving station, but is occupied for relatively extended periods of time at the milking station. It is an object of the present invention to afford a novel milking system of the aforementioned type wherein the parts are so constituted and arranged that if the discharge apparatus thereof should malfunction during a milking operation so that milk is not discharged, the system will automatically shut down even though the operator may not be present at the receiving station.

An object ancillary to the foregoing is to afford a novel milking system of the aforementioned type wherein such an automatic shut-down of the system occurs in such a manner that it is immediately obvious to the operator that such a shut-down has occurred, even if the operator should be at the milking station.

A further object is to afford a novel milking system of the aforementioned type wherein the entire portion of the milking system, which it is necessary to clean, may be washed and cleaned in a single operation.

Another object is to afford a novel milking system of the aforementioned type wherein not only the portions through which milk normally flows during a milking operation are effectively cleaned during a washing operation, but, also, the other portions which are not normally contacted by milk, but which might be so contacted under abnormal conditions, such as, for example, in the event of a malfunction of the aforementioned type, are also thoroughly washed and cleaned.

Yet another object of the present invention is to afford a novel milking system of the aforementioned type wherein washing liquid may be circulated through the system in a novel and expeditious manner.

A further object is to afford a novel milking system of the aforementioned type wherein, during a washing cycle of operation, such washing liquid is agitated in a manner which affords a highly effective washing and cleaning action.

Another object is to afford a novel milking system of the aforementioned type which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a somewhat diagrammatic view of a milking system embodying the principles of the present invention;

FIG. 2 is a fragmentary detail elevational view of a portion of the milking system shown in FIG. 1, showing certain parts thereof disposed in a different operative position;

FIG. 3 is an enlarged, detail sectional view of a portion of the milking system shown in FIG. 1;

FIG. 4 is a fragmentary detail view of a portion of the milking system shown in FIG. 1, with certain parts disposed in different operative position;

FIG. 5 is a fragmentary detail view of a portion of the milking system shown in FIG. 1, with certain parts disposed in different operative position; and FIG. 6 is a fragmentary view of a portion of a milking system illustrating a modified form of the present invention.

A milking system 1, embodying the principles of the present invention, is shown in the drawings to illustrate the preferred embodiment of the present invention;

The milking system 1 includes, in general, a milk line 2 for feeding milk from a milking station M to a receiving station R, and discharging the milk at the latter station; a vacuum line 3 connected to the milk line 2 and to a suitable vacuum source 4, such as, for example, a suitable vacuum pump; and a wash line 5 connected to the milk line 2.

It will be understood by those skilled in the art that the milking station M is normally located in that portion of a dairy barn, or the like, containing the stanchions or stalls in which the cows are placed while they are being milked; and the receiving station R is normally located in a portion of such a dairy barn, or the like, remote from the milking station M, and is commonly in a special room which is separated from the remainder of the barn. The receiving station R shown in the drawings includes a suitable receptacle in the form of a cooling tank 6 for receiving the milk discharged at the receiving station R from the milk line 2, and a suitable reservoir, in the form of a tank 7, for holding a supply of washing liquid or washing solution for use during a washing cycle of operation as will be discussed in greater detail presently, FIG. 1.

An elongated conduit 8, having one end operatively connected to the vacuum source 4, extends from the vacuum source 4 to and through the milking station M and terminates in a capped end 9 at the side of the milking station M remote from the vacuum source 4, for a purpose which will also be discussed in greater detail presently.

The milk line 2 includes an elongated pipe or conduit 9, a receiver 10 and a releaser 11. The conduit 9 extends from the milking station M to the receiving station R, where it is operatively connected to the upper end portion of the receiver 10. The receiver 10 has a discharge nipple 12 in the bottom thereof, which is operatively connected by a suitable pipe or conduit 13 to the upper end portion of the releaser 11. The conduit 13 includes a swivel joint 14 on which the releaser 11 may be swung from the position shown in solid lines in FIG. 1, wherein it is disposed in position to discharge into the washing liquid reservoir 7, and the position shown in broken lines in FIG. 1, wherein it is disposed in position to discharge into the milk-receiving tank 6. The releaser 11 may be of any suitable type available on the market.

The milk line conduit 9 extends through the milking station M and, at the milking station M, has a plurality of stall cocks 15 to which suitable claw assemblies, such as the claw assembly 16, FIGS. 1 and 2, may be connected for feeding milk from the cows being milked to the milk line 9.

The vacuum line 3 includes an elongated pipe or conduit 17; a differential valve 18 connecting one end of the conduit 17 to the upper end portion of the receiver 10; a wash trap 19 connected to the other end of the conduit 17; and a pipe or conduit 20 connecting the wash trap 19 to the vacuum source 4. The wash trap 19 includes a float chamber 21 in which is mounted a float 22, and a valve 23 mounted on the upper end of the float chamber 21. The valve 23 is a three-way valve having one port connected to the conduit 20, another port connected into the float chamber 21, and another port 24 open to the atmosphere. The conduit 17 is connected to the upper end portion of the float chamber 21, and the float 22 is movable in the float chamber 21 between a raised and lowered position. The float 22 is operatively connected to the valve 23 and is operable to actuate the valve 23 in such a manner that when the float 22 is disposed in raised position, the conduit 20 is connected through the valve 23 to the interior of the float chamber 21, and the port 24 is disconnected from the conduit 20 and the interior of the float chamber 21; and when the float 22 is disposed in raised position, the port 24 is connected through the valve 23 to the interior of the float chamber 21, and the conduit 20 is disconnected from the port 24 and the interior of the float chamber 21. Thus, it will be seen that when the float 22 is disposed in lowered position, the source of vacuum 4 is connected through the conduit 20, the wash trap 19, the conduit 17, and the differential valve 18 into receiver 10 to thereby create a vacuum in the milk line 2; and when the float 22 is disposed in raised position, the source of vacuum 4 is disconnected from the wash trap 19 at the valve 23, and the float chamber 21 of the wash trap 19 and, therefore, the milk line 2, is connected to atmosphere through the port 24 in the valve 23.

The float chamber 21 has a discharge nipple 25 in the lower end portion, FIGS. 1 and 3, which, during a milking cycle of operation, is closed by a removable cap 26 mounted on the lower end portion thereof. During a washing cycle of operation, the cap 26 is removed for a purpose which will be discussed in greater detail presently.

The discharge nipple 25 has a ball check valve therein, which includes a ball 27 removably mounted between a valve seat 28 and a perforated plate or screen 29 disposed below the seat 28. When the cap 26 is removed from the nipple 25, and the float chamber 21 is evacuated by the source of vacuum 4 the ball 27 is held by the atmospheric pressure acting thereon from below, in fully raised position, wherein it is sealingly engaged with the valve seat 28 to thereby close the nipple 25 against the passage of air therethrough into the float chamber 21. When the float chamber 21 is open to the atmosphere, such as, for example, when the float 22 is disposed in fully raised position, the pressure above and below the ball 27 equalizes to thereby permit the ball 27 to drop downwardly onto the perforated plate 29, and thereby open the discharge nipple 25.

The wash line 5 includes another elongated pipe or conduit 30, which has one end operatively connected to one end of an elongated manifold 31. The manifold 31 embodies a plurality of radially outwardly projecting, axially spaced nipples 32 for a purpose which will be discussed in greater detail presently. During a milking cycle of operation, all of the nipples 32 are closed by suitable means such as, for example, caps 33. The other end of the manifold 31 is connected through a suitable pipe or hose 34, and a pulsator 35 to one end of a suitable pipe or hose 36. The other end of the pipe or hose 36 is connected to a connector nipple 37, which projects outwardly from the conduit 17 of the vacuum line 3. The pulsator 35 is operable to feed pulses or surges of air into the wash line 5, and, therefore, into the milk line 2 and the vacuum line 3, during a washing cycle of operation, for a purpose which will be discussed in greater detail presently.

The end of the conduit 30 of the wash line 5 remote from the manifold 31 is, at all times, operatively connected to the end of the conduit 9 of the milk line 2 remote from the receiver 10. During a milking cycle of operation, the tube 36 is disconnected from the nipple 37 and may be closed by suitable means such as a plug 36a, FIG. 5, and the nipples 32 on the manifold 31 are closed by the caps 33, so that the end of the wash line 5 remote from the milk line 2 is closed. Also, during a milking cycle of operation, the nipple 37 is closed by suitable means such as a cap 37a, to prevent the leakage of air therethrough into the vacuum line 3.

A suitable pulsator 38, for controlling the operation of the releaser 11, is connected to the conduit 17 of the vacuum line 3 by a suitable pipe or hose 39, and is also connected by a pipe or hose 40, a moisture trap 41, and a pipe or hose 42 to the upper end of the releaser 11. When liquid is present in the milk line 2, and the conduit 17 is evacuated, the pulsator 38 is effective to alternately withdraw air from and feed air into, the releaser 11 to thereby cause liquid to flow from the receiver 10 into the releaser 11, and to be discharged from the releaser 11, respectively. A suitable valve or pressure regulator 43 is embodied in the conduit 20, and is preferably so set that when the vacuum line 3 is being evacuated by the vacuum source 4, the vacuum in the conduit 17 is fifteen inches of mercury. The differential valve 18 is preferably such that when the vacuum in the conduit 17 is fifteen inches of mercury, the vacuum in the receiver 10 is between thirteen and a half inches of mercury and fourteen inches of mercury.

The claw assembly 16, shown in the drawings, is of the type which includes four teat cups 44 for attachment to the teats of a cow to be milked; conduit means including a nipple 45 and a suitable hose 46 for feeding liquid from the teat cups 44 to the milk line conduit 9 or the like; and other conduit means including a connecting nipple 47 and a suitable hose 48 for withdrawing air from, and feeding air into the teat cups 44, for pulsing the latter in a manner well known to those skilled in the art.

In a milking operation of the milking system 1, the nipple 37 is closed by the cap 37a, the nipples 32 on the wash manifold 31 are closed by the caps 33, and the releaser 11 is disposed in operative position over the cooling tank 6, as shown in broken lines in FIG. 1. Thereafter, operation of the source of vacuum 4 may be initiated so that a partial vacuum is created in the vacuum line 3 and the vacuum conduit 8, the stall cocks at each of the stalls or stanchions at which a milking operation is to take place may be opened, and the hoses 46 of respective ones of the claw assemblies 16 may be attached thereto, as illustrated at the single stall cock 15 shown in FIG. 2. The hose 48 of each such respective claw assembly 16 may then be connected through a suitable pulsator 49, hose 50, and shut-off valve 51 to the vacuum conduit 8, and the respective valves 51 may then be opened. Thereafter, the teat cups 44 of the claw assemblies 16, which are thus connected into the milking system 1, may then be connected to the teats of the respective animals to be milked to thereby commence the milking cycle of operation.

The milk withdrawn by the claw assemblies 16 from the animals being milked flows through the hoses 46 thereof into the conduit 9 of the milk line 2, which slopes from the milking station M to the receiver station R a proper amount, such as, for example, one inch in each ten feet of length of the conduit 9. The milk thus received in the conduit 9 flows by gravity, and, also, because of the partial vacuum created in the milk line 2 by reason of its connection with the vacuum line 3, into the receiver 10, and from there into the releaser 11. The pulsator 38, which is connected to the vacuum conduit 17 and the releaser 11 is operable to cause the releaser 11 to periodically dump the milk flowing thereinto from the receiver 10 into the tank 6, without breaking the vacuum in the receiver 10. When the milking of one cow has been completed, the claw assembly at that stanchion may be removed from the cow, and the valve 15 at that stanchion may be closed. Thereafter, another cow may be moved into that stanchion, and the claw assembly 16 connected to the teats of that animal, or the claw assembly 16 may be taken to another stanchion and connected to another animal and to the valve 15 at that location.

In such a milking operation, the pulsing of the teat cups 44 by the pulsator 49 is preferably at a relatively rapid rate, such as, for example, in the nature of sixty pulses per minute, and the pulsing of the releaser 11 by the pulsator 38 is at a substantially slower rate, such as, for example, in the nature of ten pulses per minute. In the normal milking operation of the milking system 1, the rate of flow of milk into the receiver 10, and the rate which the milk is dumped by the releaser 11, is such that the receiver 10, at all times, is maintained in a partially filled condition.

If for some reason, such as, for example, a malfunction of a portion of the milking system 1 whereby the releaser 11 fails to dump milk, or the rate of flow of milk into the receiver 10 is too great as compared to the rate of dumping by the releaser 11, so that the receiver 10 completely fills with milk, the milk in the receiver 10 will overflow therefrom through the differential valve 18 into the vacuum conduit 17. The conduit 17 slopes from the differential valve 18 to the wash trap 19 a proper amount, such as, for example, at a rate of one inch in each ten feet of length of the conduit 17, so that milk which is thus fed from the receiver 10 into the conduit 17 will flow by gravity, and because of the partial vacuum in the vacuum line 3, into the float chamber 21 of the wash trap 19.

It will be remembered that during a milking operation the discharge nipple 25 of the float chamber 21 is closed by the cap 26. Therefore, when milk thus flows into the float chamber 21, it cannot escape therefrom through the discharge nipple 25, and as the level of the milk rises in the milk chamber 21, it is effective to raise the float 22 to the aforementioned raised position. The raising of the float 22 is effective to actuate the valve 23 into the position wherein communication between the conduit 20 and the float chamber 21 is disrupted, and communication is established between the interior of the float chamber 21 and the atmosphere through the port 24. This permits atmospheric air to flow into the float chamber 21 and, therefore, into the vacuum conduit 17 and into the milk line 2. This breaks the vacuum in the hoses 46 on the claw assemblies 16 at the milking station M, so that the claw assembly 16 will fall from the teats of the animals being milked, thereby stopping the milking operation and signalling the operator at the milking station M that a malfunction has occurred in the system.

After such malfunction has been corrected, the cap 26 may be removed from the float chamber 21, and the milk drained from the vacuum line 3. Thereafter, the milking operation may again be initiated in the previously described manner.

For sanitation purposes, it is essential that at the completion of an entire milking operation, the portions of a milking system which come in contact with the milk being handled, be thoroughly cleaned. With a milking system constituted and arranged in accordance with the present invention, this may be quickly and easily accomplished, as will now be described.

After a milking cycle of operation of the milking system 1, when it is desired to initiate a washing cycle of operation, all of the stall cocks 15 may be manually closed and the claw assemblies 16 removed therefrom. Thereafter, the caps 33 may be removed from one or more of the nipples 32 on the manifold 31, and suitable respective conduits, such as, claw assemblies 16 may be connected to the thus opened nipples 32 for feeding washing liquid from the reservoir 7 into the manifold 31. When the claw assemblies 16 are used as such conduits, the free ends of the hoses 46 thereof are connected to the respective uncovered nipples 32, and the claw assemblies 16 may be suspended therefrom in such position that the teat cups 44 thereof are submerged in the washing liquid 7a in the reservoir 7 at all times during the washing cycle of operation. The caps 33 on any nipples to which claw assemblies 16 are not attached are retained in closing position on those nipples.

Thereafter, the releaser 11 may then be swung into the position shown in solid lines in FIG. 1, wherein it is disposed in operative position above the washing liquid reservoir 7. The cap 37a may then be removed from the nipple 37, and the conduit 36 may then be connected to the nipple 37 to thereby operatively connect the pulsator 35 to the conduit 17 of the vacuum line 3 for a purpose which will be discussed in greater detail presently.

It will be remembered that the conduit 30 of the wash line 5 is connected to the conduit 9 of the milk line 2, so that the vacuum in the vacuum line 3 and the milk line 2 extends into the wash line 5. The vacuum in the wash line 5 causes the washing liquid in the reservoir 7 to flow through the claw assemblies 16 into the manifold 31, and from there through the conduit 30 into the conduit 9 of the milk line 2. As many claw assemblies 16 or other suitable conduits may be connected to the manifold 31 and extended into the washing liquid 7a in the tank 7 as are necessary to insure that a sufficient quantity of liquid will flow into the wash line 5 and, therefore, into the milk line 2 that the rate of flow into the receiver 10 is at a faster rate than it will be discharged by the releaser 11. With this construction and arrangement of parts, the washing liquid flowing into the receiver 10 from the wash line 5 overflows from the receiver 10 through the differential valve 18 into the vacuum conduit 17, and flows therethrough into the float chamber 21 of the wash trap 19.

It will be remembered that during a washing cycle of operation, the cap 26 is removed from the discharge nipple 25 on the float chamber 21. However, during the initial flow of washing liquid into the float chamber 21, the atmospheric pressure acting on the lower face of the ball 27 is effective to retain the ball 27 in seating engagement with the valve seat 21, because of the vacuum in the float chamber 21, to thereby prevent the discharge of the washing liquid from the wash trap 19. As the washing liquid continues to flow into the float chamber 21, and the level thereof rises, the float 22 is moved upwardly thereby into the aforementioned fully raised position therefor, and this is effective to actuate the valve 23 and thereby disrupt the connection between the vacuum conduit 20 and the float chamber 21, and open communication between the float chamber 21 and the atmosphere through the port 24. When this occurs, the air pressure above and below the ball 27 equalizes to thereby permit the ball 27 to drop downwardly and thus permit the washing liquid in the float chamber 21 to flow outwardly through the discharge nozzle 25 into the tank 27. The disruption of the vacuum in the float chamber 21, also disrupts the vacuum in the conduit 17 of the vacuum line 3 and stops the feeding of liquid from the tank 7 into the wash line 5, the milk line 2 and the vacuum line 3.

As the liquid in the float chamber 21 drains therefrom, the float 22 drops down into the aforementioned fully lowered position, wherein it is effective to actuate the valve 23 to again connect the interior of the float chamber 21 to the vacuum conduit 20, and close the connection of the float chamber 21 to the atmosphere through the port 24. This again creates a vacuum in the float chamber 21 and the remainder of the vacuum line 3, to thereby cause the ball 27 to again seat against the valve seat 28 and again commence the feeding of liquid from the tank 7 into the wash line 5 and, therefore, into the milk line 2. All of this washing liquid again flows through the wash line 5 and the milk line 2, and is dumped back into the reservoir 7 by the releaser 11, until the receiver 10 again completely fills and overflows into the wash trap 19 and initiates another dumping cycle of operation of the wash trap 19. This operation, with the wash trap intermittently filling and dumping is continuously repeated during a washing cycle. Preferably, such dumping of the wash trap occurs approximately once or twice per minute, with each dumping of the wash trap taking approximately five seconds.

It will be remembered that during the feeding of washing liquid into the wash line 5, the pulsator 35 is operatively connected to the vacuum line 3 through the nipple 37. When so connected to vacuum, the pulsator 35 is operable to intermittently feed pulses or surges of atmospheric air into the manifold 31, and, therefore, into the liquid being fed into the wash line 5, the milk line 2 and the vacuum line 3. Preferably the pulsator 35 is effective to feed such pulses of air at a rate of approximately thirty per minute. These pulses of air create relatively violent agitation and surging of the washing liquid throughout the wash line 5, the milk line 2 and the vacuum line 3, which affords a highly effective washing and scrubbing action.

The washing operation may be continued for as long a period of time, and with whatever washing solutions are required, as may be necessary to comply with the local regulations and to afford the proper cleanliness of the milking system 1.

It will be seen that by using the claw assemblies 16 as the hoses by which liquid may be fed from the reservoir 7 to the washing manifold 31, the claw assemblies, themselves, are washed and cleaned. However, if desired, other suitable hoses or conduits may be used for this purpose, and the claw assemblies 16 may be separately washed and cleaned.

The pulsators 35, 38, and 49 may be any suitable type available on the market, but the pulsators 35 and 49, preferably, are of the type shown in the application for United States Letters Patent of Clyde D. Cochran, Serial No. 226,328, filed September 26, 1962, now patent No. 3,183,920.

The modified form of milking system 1a shown in FIG. 6 is identical in construction to the milking system 1 shown in FIG. 1, except that the nipple 37, the pulsator 35, and the hoses 34 and 36 have been eliminated; and the milking system has been modified so as to enable the pulsator 38, rather than the pulsator 35, to feed surges of air into the wash line 5 during a washing cycle of operation.

In the milking system 1a, a check valve 38a is connected to the pulsator 38 in the same manner as the conduit 40. The check valve 38a may be of any suitable type readily available on the market, such as, for example, a suitable ball check valve, and is of the type which closes when the pressure in the pulsator 38 is less than the pressure on the side of the check valve 38a remote from the pulsator 38, and opens when the pressure in the pulsator 38 is greater than the pressure on the side of the check valve 38a remote from the pulsator 38.

As shown in FIG. 6, during a washing cycle of operation a suitable hose or conduit 36a is connected at one end to the side of the check valve 38a remote from the pulsator 38, and the other end of the hose or conduit 36a is connected to the end of the manifold 31, to which the pulsator 35 is connected to the milking system 1 shown in FIG. 1. With this construction, when the pulsator 38 is effective to create a partial vacuum in the conduit 40, the check valve 38a closes. However, when, in the operation of the pulsator 38, it is effective to feed air at atmospheric pressure into the conduit 40, the pressure in the pulsator 38 is greater than the pressure on the side of the check valve 38a remote therefrom, so that a surge of air also rushes through the check valve 38a, and the conduit 36a into the manifold 31 of the wash line 5 to thereby create turbulence in the wash line 5, the milk line 2, and the vacuum line 3 in a manner similar to that heretofore described with respect to the operation of the pulsator 35 in the milking system 1.

It will be remembered that the pulsing of the pulsator 38 is preferably at a relatively slow rate, such as, for example, at the rate of ten pulses per minute. Therefore, the amount of air fed into the wash line 5 and, therefore, into the milk line 2 and the vacuum line 3 of the milking system 1a, through the check valve 38a, during each pulse of the pulsator 38 is substantially greater than the amount of air fed into corresponding portions of the milking system 1 during a pulse of the pulsator 35. Therefore, the turbulence created in the modified milking system 1a during a washing cycle of operation is not as great as the turbulence in the washing system 1. However, it is sufficient to afford effective washing and cleansing operation, particularly in systems wherein the length of the lines 2–3–5 are not excessively long.

From the foregoing, it will be seen that the present invention affords a novel milking system which is particularly well adapted for use as a permanent pipe line type of milking system.

Also, it will be seen that the present invention enables such a milking system to be quickly and easily cleaned in a novel and expeditious manner.

In addition, it will be seen, that the present invention affords a novel milking system which is practical and efficient in operation and which may be readily and economically produced commercially.

We claim:

1. A milking system of the type including a milking station and a receiving station, and comprising
    (a) means, including a milk line, for feeding milk from said milking station and discharging said milk at said receiving station,
    (b) means, including a vacuum line operatively connected to said milk line, for controlling the feeding of milk through said milk line,
    (c) means, including a wash line operatively connected between said milk line and said vacuum line, for feeding washing liquid into said milk line and vacuum line, and
    (d) means, including
        (1) a wash trap operatively connected into said vacuum line, and
        (2) said first-mentioned means,
    for discharging said washing liquid from said milk line and said vacuum line.

2. A milking system of the permanent pipe line type which includes a milking station and a receiving station, and comprising (a) means, including
(1) an elongated conduit extending from said milking station to said receiving station, and
(2) a releaser disposed at said receiving station and operatively connected to said conduit,
for feeding milk from said milking station and discharging said milk at said receiving station,
(b) means, including a vacuum line operatively connected to said conduit, for controlling the feeding of milk through said conduit,
(c) means, including a wash line operatively connected between said conduit and said vacuum line, for feeding washing liquid into said conduit and vacuum line,
(d) means for feeding air into said third-mentioned means and thereby into said conduit and said vacuum line for thereby agitating said working liquid in said conduit and said vacuum line,
(e) teat cups selectively connectable
(1) to said first-mentioned means for feeding milk into said conduit, and
(2) to said third-mentioned means for feeding said washing liquid into said wash line, and
(f) means, including
(1) a wash trap operatively connected into said vacuum line, and
(2) said first-mentioned means,
for discharging said washing liquid from said conduit and said vacuum line.

3. A milking system of the type including a milking station and a receiving station, and comprising
(a) means, including
(1) an elongated conduit extending from said milking station to said receiving station, and
(2) a releaser disposed at said receiving station and operatively connected to said conduit,
for feeding milk from said milking station and discharging said milk at said receiving station,
(b) vacuum means, including another conduit operatively connected to said first-mentioned conduit, for controlling the feeding of milk through said first-mentioned conduit,
(c) means, including a wash line operatively connected between said conduits for feeding washing liquid into said first-mentioned means and into said other conduit,
(d) a pulsator operatively connected to said third-mentioned means for intermittently feeding surges of air into said third-mentioned means during feeding of said washing liquid from said third-mentioned means into said first-mentioned means and said other conduit to thereby agitate said washing liquid in said first-mentioned means and said other conduit,
(e) teat cups selectively connectable
(1) to said first-mentioned means for feeding milk into said first-mentioned means,
(2) to said third-mentioned means for feeding said washing liquid into said wash line, and
(f) means, including
(1) a wash trap operatively connected into said other conduit, and
(2) said first-mentioned means,
for discharging said washing liquid from said first-mentioned means and said vacuum means.

4. A pipe line milking system of the type having a milking station and a receiving station, and comprising
(a) a plurality of teat cups,
(b) means, including
(1) said teat cups,
(2) an elongated conduit,
(3) a receiver, and
(4) a releaser,
for feeding milk from said milking station to said receiving station and discharging said milk at said receiving station,
(c) vacuum means, including another elongated conduit operatively connected to said first-mentioned conduit,
(d) means, including
(1) said teat cups, and
(2) a third elongated conduit operatively to said first-mentioned and other conduits,
for feeding washing liquid into said first-mentioned means for passage from said milking station into said releaser and into said other conduit, and
(e) means, including a trap operatively connected to said other conduit in position to receive said washing liquid therefrom, for discharging said liquid from said other conduit and controlling the discharging of said liquid from said other conduit and from said first-mentioned means.

5. A pipe line milking system as defined in claim 4, and which includes
(a) a pulsator operatively connected to third-mentioned means and to said other conduit when said liquid is being fed into said first-mentioned means for intermittently feeding surges of air into said liquid and thereby agitate said liquid.

6. A pipe line milking system as defined in claim 4, and in which
(a) said fourth-mentioned means includes a pulsator operatively connected to said releaser and to said trap for controlling the discharge of liquid from said first-mentioned means.

7. A pipe line milking system of the type having a milking station and a receiving station, and having a milking cycle of operation and a washing cycle of operation, said milking system comprising
(a) means for feeding liquid from said milking station to said receiving station,
(b) said means including
(1) an elongated conduit extending from said milking station,
(2) a releaser disposed at said receiving station for discharging said liquid thereat, and
(3) a receiver disposed between, and operatively connected to said conduit and said releaser for receiving said liquid from said conduit and feeding said liquid to said releaser
(c) vacuum means, including another elongated conduit operatively connected to said receiver, for applying suction to said receiver and said first-mentioned conduit,
(d) means, including a third elongated conduit operatively connected to said first-mentioned conduit, for feeding liquid into said first-mentioned means at a rate faster than said releaser discharges it so that a portion of said liquid in said first-mentioned means flows into said other conduit, and
(e) means
(1) including a trap
(a') having an openable and closable discharge means,
(b') disposed in position at said receiving station to receive liquid from said other conduit and discharge said last-mentioned liquid at said receiving station when said discharge means are open,
for discharging said liquid received by said other conduit.

8. A pipe line milking system as defined in claim 7, and in which
(a) said trap includes
(1) a chamber for receiving said liquid from said other conduit,
(2) a valve openable and closable to thereby admit and withdraw air into and from said chamber and said other conduit, and
(3) a float in said chamber operatively connected to said valve and movable between a raised and lowered position to thereby open and close said valve.

9. A pipe line milking system as defined in claim 8, and which includes
(a) a pulsator operatively connected to said releaser and to said other conduit for controlling said discharge of liquid from said releaser.

10. A pipe line milking system as defined in claim 8, and which includes
(a) a pulsator operatively connected to said third-mentioned means and to said other conduit for intermittently feeding surges of air into said third-mentioned means during the feeding of liquid from said third-mentioned means into said first-mentioned means and thereby agitating said liquid fed from said third-mentioned means into said first-mentioned means and into said other conduit.

11. In a milking system of the type including a milking station wherein cows to be milked may be located, and a receiving station wherein a receptacle for receiving milk and a reservoir for holding a supply of washing liquid are located, the combination of
(a) an elongated milk line having
   (1) a plurality of stall cocks operatively connected thereto in spaced relation to each other at said milking station,
(b) said stall cocks being openable and closable,
(c) a receiver operatively connected to one end of said milk line for receiving liquid therefrom,
(d) an elongated conduit having one end operatively connected to the upper end portion of said receiver,
(e) a wash trap having
   (1) a float chamber, and
   (2) a valve having three ports
(f) one of said ports being operatively connected to the interior of said chamber,
(g) the second of said ports being connected to atmosphere,
(h) the third of said ports being connected to a source of vacuum,
(i) a float in said chamber and movable between a raised position and a lowered position,
(j) said float
   (1) being operatively connected to said valve, and
   (2) being operable when disposed in said lowered position to operatively connect said one and third parts and to close communication between said second port and the other of said ports, and
   (3) being operable when disposed in said raised position to operatively connect said one and second ports and to close communication between said third port and the other of said ports,
(k) the other end of said conduit being operatively connected to the interior of said float chamber,
(l) said float chamber having discharge means in the bottom thereof,
(m) valve means in said discharge means and operable
   (1) to close said discharge means when the pressure in said chamber is below a predetermined pressure, and
   (2) to open said discharge means when the pressure in said chamber is above a predetermined pressure,
(n) other means mountable on and removable from said discharge means for opening and closing the latter,
(o) a releaser at said receiving station,
(p) a pulsator operatively connected to said releaser and to said conduit for alternately admitting and withdrawing air into and from said releaser,
(q) said releaser being operatively connected to said receiver for receiving liquid therefrom during the time air is withdrawn from said releaser,
(r) said releaser
   (1) being operable to discharge such liquid therefrom during the time air is admitted thereinto by said pulsator, and
   (2) being movable between one position for discharging said liquid into said receptacle and another position for discharging said liquid into said reservoir,
(s) an elongated wash line having one end operatively connected to the other end of said milk line,
(t) a manifold operatively connected to the other end of said wash line,
(u) another valve operatively connected to said vacuum line,
(v) another pulsator
   (1) operatively connected between said manifold and said other valve, and
   (2) operable, when said other valve is open and said float is disposed in said lowered position, to intermittently admit air into said manifold, and
(w) a plurality of claw assemblies,
(x) said claw assemblies being adapted
   (1) to be connected to said stall cocks for feeding milk from said milking station to said releaser for discharge therefrom into said receptacle when said releaser is disposed in said one position, said stall cocks are open, said other valve is closed, and said other means are mounted on said discharge means, and
   (2) to be connected to said manifold for feeding washing liquid from said reservoir to said releaser and said wash trap for discharger therefrom, when releaser is disposed in said other position, said stall cocks are closed, said other valve is open, and said other means are removed from said discharge means.

References Cited by the Examiner
UNITED STATES PATENTS

| | | | |
|---|---|---|---|
| 2,708,448 | 5/1955 | Reeve | 119—14.18 |
| 2,733,667 | 2/1956 | Hill | 103—236 |
| 2,786,445 | 3/1957 | Golay | 119—14.05 |
| 2,808,025 | 10/1957 | Graves | 119—14.01 |
| 3,116,714 | 1/1964 | Bender | 119—14.18 |

SAMUEL KOREN, *Primary Examiner.*
ALDRICH F. MEDBERY, *Examiner.*